Aug. 6, 1963     C. W. HEPPENSTALL     3,100,067
COMPOSITE CLOSURE
Filed May 15, 1961
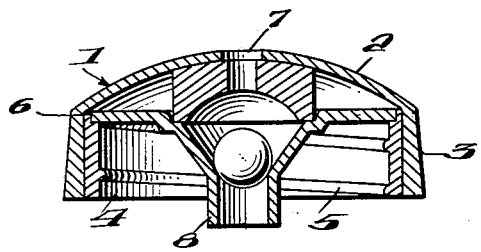
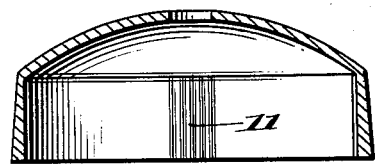
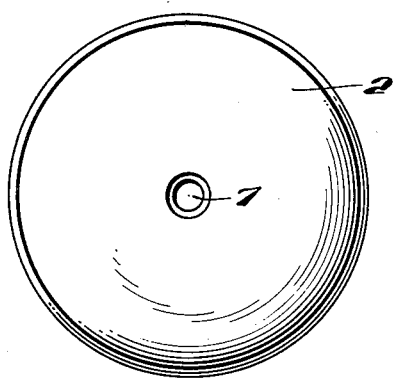
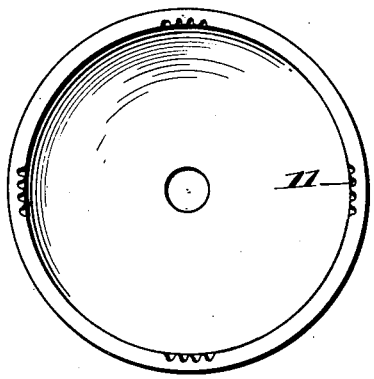
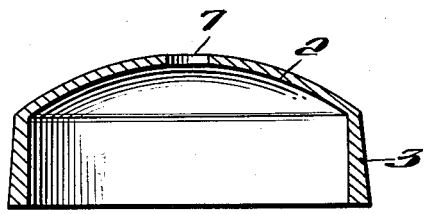
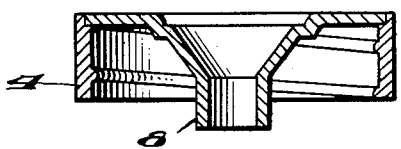
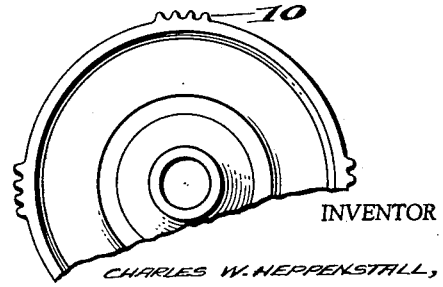
INVENTOR
CHARLES W. HEPPENSTALL,
BY
ATTORNEYS

United States Patent Office 3,100,067
Patented Aug. 6, 1963

3,100,067
COMPOSITE CLOSURE
Charles W. Heppenstall, P.O. Box 2325,
Delray Beach, Fla.
Filed May 15, 1961, Ser. No. 109,891
2 Claims. (Cl. 222—190)

The present invention relates to closures and in particular to closures which are a composite of a metal outer shell and a plastic liner.

Such closures have been produced heretofore, including those with hidden threads, but have proven to be unsatisfactory inasmuch as the plastic liner tends to separate from the metal outer shell in a short time, due to shrinkage of the plastic selected and to the method of assembly.

An object of the present invention is the provision of a composite closure which is highly durable and which maintains its composite integrity for the life or any container to which it is applied.

Another object of the invention is the provision of a composite closure having hidden threads, which can be used with corrosive materials, food stuffs, and the like.

Still another object of the invention is the provision of a composite closure which can be economically mass produced.

Other objects will become apparent from the description and the claims.

A composite closure has been developed through the present invention which meets these objectives. It comprises a thin-walled, metallic, outer shell and a liner of resilient plastic material engaged within the metal outer shell. The plastic liner has internal threads formed on the inner wall thereof. Moreover, according to the invention, the liner has an outside diameter in the free state greater than the inside diameter of the wall of the metal outer shell and is secured in the shell by a press-fit.

Under some circumstances, an adhesive composition can be used to further advantage, between the plastic liner and the metal outer shell.

The invention also contemplates in an additional embodiment; the use of keys on the outside diameter of the plastic liner and key-ways on the inside diameter of the metal outer shell plus a light press-fit.

Where the closure is used for dispensing purposes, the inner wall of the liner can have an annular groove adjacent the top of the thread-section. As a dispensing closure, the metal outer shell has a central opening or exit hole and a dispensing member can be engaged in the groove transverse the liner.

The composite closure of the invention is obtained by forming a thin-walled, metallic shell having an annular wall depending from the ceiling thereof; forming a liner of resilient plastic material having an outside diameter greater than the inside diameter of the depending wall of the metal outer shell; heat-treating the plastic liner to pre-shrink it, if the type of plastic requires this treatment; and then press-fitting the plastic liner into the metal outer shell. The outside diameter of the liner is predetermined to remain greater than the inside diameter of the metal outer shell whether or not it is necessary to preshrink the plastic liner. The necessity for pre-shrinking the plastic liner depends on the type of plastic selected.

To salvage parts of the closures that are out of manufacturing tolerances, an adhesive composition can be applied to the outer wall of the liner before engaging the metal outer shell and the plastic liner by a press-fit.

The invention will be better understood through reference to the drawings herewith, wherein:

FIG. 1 is a cross-sectional view of a composite closure according to the invention;

FIG. 2 is a plan view of the closure;

FIGS. 3 and 4 are cross-sectional views of the metal outer shell and the liner respectively;

FIGS. 5 and 6 are cross-sectional and bottom plan views of a metal outer shell according to another embodiment of the invention; and FIGS. 7 and 8 are cross-sectional and bottom plan views of a liner for the shell shown in FIGS. 5 and 6.

Referring to the drawings, the closure is seen to comprise a metal outer shell 1 having a ceiling 2 and an annular wall 3 depending therefrom. Engaged within the wall of the metal outer shell is a liner 4 having internal threads 5 formed on the inner wall thereof.

The outside diameter "D" of the liner in the free state is greater than the inside diameter "d" of the wall of the metal outer shell. Because of the materials of which the two members are made and the manner in which they are engaged, the liner is secured in the metal outer shell by means of a press-fit.

Where, as illustrated, the closure is to be used as a dispensing closure, the inner wall of the liner has an annular groove 6 therein adjacent the top of the thread-section. A dispensing member 8, like that disclosed in my U.S. Patent No. 2,974,833, can be engaged in this groove 6 transverse the liner. Dispensing is effected through the central opening or exit hole 7 in the ceiling 2 of the metal outer shell.

The metal outer shell 1 can be made from steel, nickel-plated steel, chrome-plated steel, enameled steel, stainless steel, aluminum, anodized aluminum, copper, brass, and similar materials. It can be produced in one of a number of ways, including by extrusion, die forming, spinning, and in some special applications by die casting. The closure may be used for other purposes than with a dispensing container in which event no exit hole is provided in the metal outer shell.

The liner is made of a plastic material such as polyethylene, polypropylene, and butyrate. The polyethylene can be low-density or high-density type. Polypropylene is preferred. The liner need not be provided with an exit hole should the closure be used for purposes other than with a dispensing container.

The plastic liner can be made by the injection molded process, wherein polypropylene is the most suitable material; by the extrusion process; or by the blow molding process.

Some plastics, and particularly low and high density polyethylene, shrink over a period of time. It is important that any plastic liner made of either low-density polyethylene or high-density polyethylene be heat-treated before use. In the case of high-density polyethylene, the shrinkage without heat-treatment continues for as much as a two-year period. After manufacture by the injection molding process, a plastic liner made of high-density polyethylene should be heat-treated at 220° F. for at least 10 minutes. The period of heat-treatment depends on the total volume of material in the plastic liner. The allowance for shrinkage during heat-treatment must be determined by experiment and varies with the diameter and the volume. The amount of shrinkage is also affected by such factors as the coloring material used in the plastic.

The present invention takes shrinkage into account by pre-shrinking the plastic liner, if the plastic requires it, before it is inserted by press-fit into the metal outer shell.

In an example of the method of producing the closure according to the invention, a metal outer shell of stainless steel, type 304, having a wall thickness of 0.024" and an inside diameter of 1.466±.001" was formed. A plastic liner of polypropylene was injection molded from Profax 6513–J of the Hercules Powder Company. The wall thickness of the plastic liner from the base of the thread to the outside diameter was 0.070". The outside diameter of the plastic liner at the bottom of the liner was 1.480≠.002". The outside diameter of the plastic liner had a 3° taper.

The plastic liner was then engaged in the metal outer shell by a press-fit with a 0.015" differential on the diameters.

The resulting composite closure was entirely satisfactory and showed no signs of separation of the plastic liner and the metal outer shell over an extended period of use.

Referring again to the drawings, FIGS. 5 to 8 show another embodiment of the invention wherein keys 10 are formed on the plastic liner and grooves or key-ways 11 are formed in the metal outer shell.

In an example of the assembly of a closure embodying this additional feature, a metal outer shell with key-ways and a plastic liner with keys 5 and 6, were engaged by a light press-fit through a 0.005–0.007" differential on the diameters.

On a large mass production basis, it is desirable to avoid the use of adhesives. In a large production; namely, 100,000 closures or more per run, there is an advantage in using adhesives to salvage parts that are out of manufacturing tolerances. This can be done for all assemblies where the press-fit is not sufficient. By placing a small amount of suitable adhesive in the outside diameter of the plastic liner and then proceeding to press the plastic liner into the metal outer shell, a satisfactory composite closure is obtained.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A composite closure comprising a thin-walled, metallic, outer shell having a ceiling with a central opening and an annular wall depending from the ceiling, a liner of resilient preshrunk plastic material engaged within the metal outer shell and having internal threads formed on the inner wall thereof, said liner having an outside diameter in the free state greater than the inside diameter of the depending wall of the metal outer shell and being press-fit in said metal outer shell, said inner wall of the liner having an inner annular groove at the top thereof and a dispensing member having a substantially flat peripheral portion and a central opening, the peripheral portion seated in the annular groove of said liner.

2. A composite closure according to claim 1 wherein said metal outer shell has key-ways on the inside diameter and keys on the outside diameter of the plastic liner.

References Cited in the file of this patent

UNITED STATES PATENTS

| | | |
|---|---|---|
| 1,266,989 | Prime | May 21, 1918 |
| 2,106,464 | Meyer | Jan. 25, 1938 |
| 2,533,915 | Brooks | Dec. 12, 1950 |
| 2,680,665 | Martin | Sept. 21, 1954 |
| 2,716,504 | Martin | Aug. 30, 1955 |
| 2,762,381 | Rainer | Sept. 11, 1956 |
| 2,989,785 | Stahl | June 27, 1961 |